United States Patent [19]

Kouloheris et al.

[11] 4,250,155

[45] Feb. 10, 1981

[54] METHOD OF PURIFYING PHOSPHORIC ACID AFTER SOLVENT EXTRACTION

[75] Inventors: Anastasios P. Kouloheris; JoAnne LeFever, both of Brandon, Fla.

[73] Assignee: Gardinier, Inc., Tampa, Fla.

[21] Appl. No.: 914,289

[22] Filed: Jun. 9, 1978

[51] Int. Cl.$^2$ ............................................. C01B 25/16
[52] U.S. Cl. ................... 423/321 R; 210/690; 210/777; 423/321 S
[58] Field of Search ............ 423/8, 10, 321 R, 321 S, 423/319; 210/24, 40, 75; 23/293 R

[56] References Cited

U.S. PATENT DOCUMENTS

| | | | |
|---|---|---|---|
| 1,597,984 | 8/1926 | La Bour | 423/321 R |
| 3,505,013 | 4/1970 | Araki et al. | 423/321 R |
| 3,573,182 | 3/1971 | Churchward et al. | 423/24 |
| 3,969,483 | 7/1976 | Stinson et al. | 423/321 S |
| 4,064,220 | 12/1977 | Alon | 423/321 R |

FOREIGN PATENT DOCUMENTS

| | | | |
|---|---|---|---|
| 463505 | 3/1950 | Canada | 423/321 R |
| 2429758 | 1/1975 | Fed. Rep. of Germany | 423/321 R |
| 47-15457 | 5/1972 | Japan | 423/321 R |
| 1103224 | 2/1968 | United Kingdom | 423/321 R |
| 1113922 | 5/1968 | United Kingdom | 423/321 R |
| 1162062 | 8/1969 | United Kingdom . | |
| 1296668 | 11/1972 | United Kingdom . | |
| 1367004 | 9/1974 | United Kingdom . | |
| 1504479 | 3/1978 | United Kingdom . | |
| 1504480 | 3/1978 | United Kingdom . | |
| 1517263 | 7/1978 | United Kingdom . | |
| 1547213 | 6/1979 | United Kingdom . | |

*Primary Examiner*—O. R. Vertiz
*Assistant Examiner*—Gregory A. Heller
*Attorney, Agent, or Firm*—Cushman, Darby & Cushman

[57] ABSTRACT

A method of purifying phosphoric acid after solvent extraction to remove residual amounts of an immiscible organic carrier including contacting the phosphoric acid with a sorbent which sorbs or takes up the residual amount of organic carrier and separating the phosphoric acid from the organic carrier-laden sorbent. The method is especially suitable for removing residual organic carrier from phosphoric acid after solvent extraction uranium recovery.

13 Claims, 1 Drawing Figure

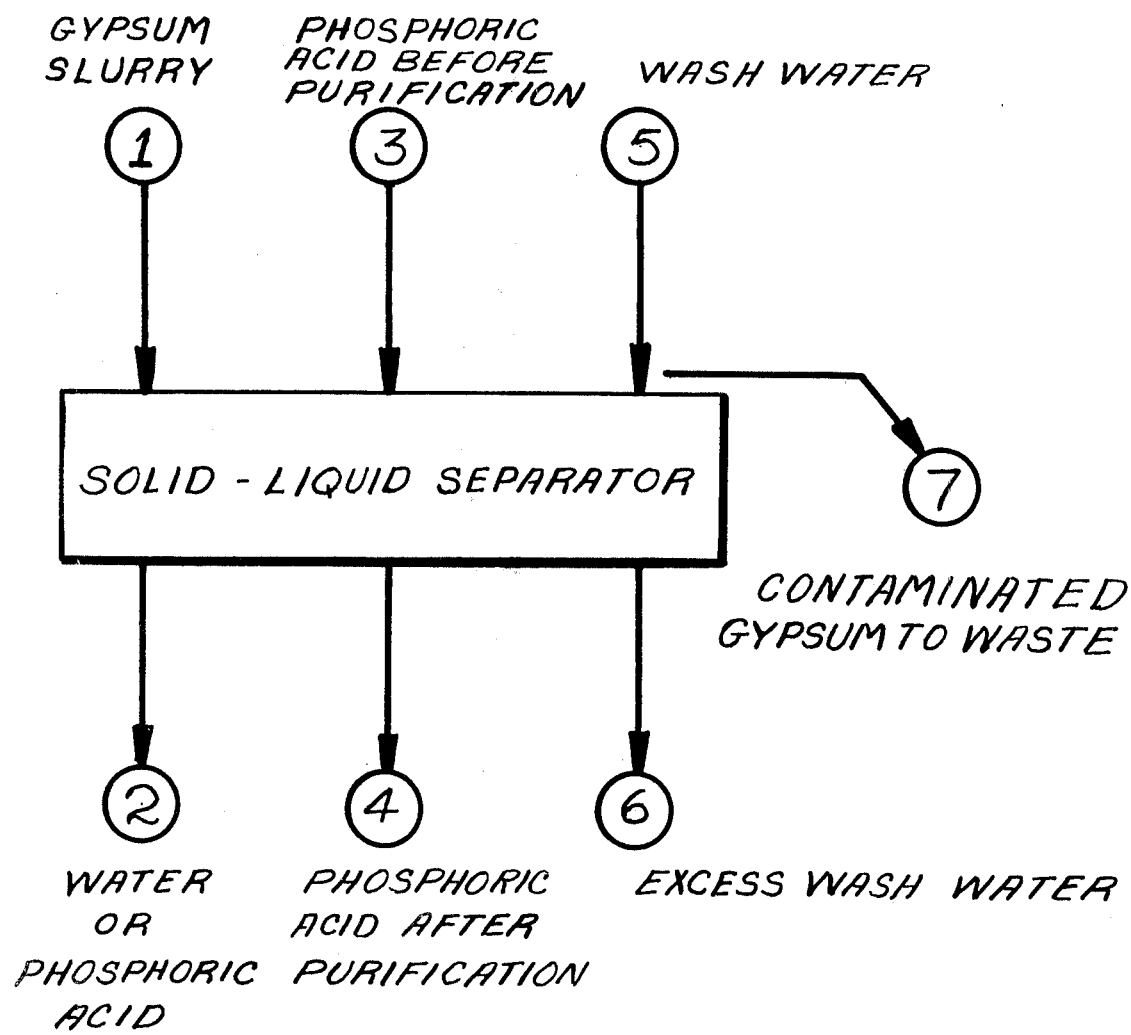

METHOD OF PURIFYING PHOSPHORIC ACID AFTER SOLVENT EXTRACTION

BACKGROUND OF THE INVENTION

The recovery of uranium from wet-process phosphoric acid has been the subject of prior study. Most marine phosphate rock contains from about 0.2 to 0.4 pounds of uranium per ton. Thus, the annual production of phosphate rock, on the order of about 40–50 millions tons yearly, represents several hundred thousand pounds of uranium.

In the wet-process for producing phosphoric acid, phosphate rock is treated with sulfuric acid in the presence of recycle phosphoric acid thereby precipitating calcium sulfate and releasing phosphoric acid. It is found that nearly all of the uranium contained in the phosphate rock is dissolved by sulfuric acid and remains in the filtrate of the crude phosphoric acid. It has been found that the filtrate of crude phosphoric acid contains from about 70% to about 90% of the uranium in the original phosphate rock.

To recover the minute uranium content of the crude wet-process phosphoric acid requires special processing techniques. These techniques are described in the *Kirk-Othmer Encyclopedia of Chemical Technology, Second Edition,* volume 21, pages 1 to 36, which are hereby incorporated by reference. Recovery of uranium from crude phosphoric acid by solvent extraction requires a solvent which is immiscible with water and which has a high affinity for uranium. These solvents extract uranium from crude phosphoric acid by the formation of a complex with the uranium. This uranium complex is soluble in excess solvent. In the usual case, the immiscible solvent which has a high affinity for uranium is dissolved in an organic carrier which is immiscible with water, such as a hydrocarbon, or substituted hydrocarbon, or an ether, alcohol or ketone. Kerosene, which is a mixture of hydrocarbons, is a preferred immiscible organic carrier. The uranium is transferred from the crude phosphoric acid to the immiscible organic solvent, and further refined and purified by techniques which are well known to the art.

The uranium-free phosphoric acid contains residual amounts of the immiscible organic carrier which must be removed. Most of the residual organic carrier is recovered by settling, that is, allowing the phosphoric acid to stand until the immiscible carrier forms a separate layer which is physically removed, e.g., by decanting. However, even after settling, the organic carrier level in acid after solvent extraction for uranium remains at about 500 to about 1000 ppm by weight. For many purposes it is essential to further reduce organic carrier level in the phosphoric acid in order, for example, not to damage rubber linings in subsequent processing equipment. Prior techniques to further reduce the amount of organic carrier in phosphoric acid after solvent extraction uranium recovery have involved settling the phosphoric acid over extremely long periods of time, aeration, and/or flotation techniques all of which are either excessively time consuming or otherwise economically unattractive.

SUMMARY OF THE INVENTION

Briefly, in accordance with the invention, it has been found that residual amounts of organic carrier can be removed from phosphoric acid with a sorbent which sorbs the organic carrier and is subsequently separated from the phosphoric acid. The sorbent may, for example, be formed into a filter cake through which the phosphoric acid containing residual organic carrier is passed. It has been found that the use of a suitable sorbent can reduce the quantity of residual organic carrier in phosphoric acid after solvent extraction uranium recovery to less than 1% of its pre-sorption value.

BRIEF DESCRIPTION OF THE DRAWING

The drawing represents a preferred embodiment of the invention in which wet-process phosphoric acid after solvent extraction uranium recovery with a kerosene carrier is purified by contact with gypsum in a solid-liquid separator, e.g., by filtering it through a gypsum containing filter which sorbs the kerosene, thus purifying the wet-process phosphoric acid.

1 represents a gypsum slurry which is the source of gypsum sorbent for the solid-liquid separator. 2 represents water or phosphoric acid passing through the sorbent separator to a recycle system. 3 represents wet-process phosphoric acid containing residual kerosene after solvent extraction uranium recovery using a kerosene carrier, which is passed through the gypsum sorbent separator. 4 represents purified wet-process phosphoric acid after having passed through the gypsum sorbent separator passing to further processing. 5 represents water to wash the kerosene-laden gypsum sorbent separator. 6 represents excess wash water after it has passed through the kerosene-laden gypsum sorbent separator. 7 represents kerosene-contaminated gypsum washed from the gypsum sorbent separator to a gypsum field.

DETAILED DESCRIPTION OF THE INVENTION

The present invention provides a method of purifying phosphoric acid containing residual organic carrier after solvent extraction by contacting the phosphoric acid with a sorbent to take up the residual organic carrier, and separating the phosphoric acid from the organic carrier-laden sorbent. It is found that by the process of the present invention the residual organic carrier level in phosphoric acid after solvent extraction can be reduced to less than 1% of its pre-sorption value.

The method of the present invention is especially suitable for removing residual organic carrier from phosphoric acid after solvent extraction uranium recovery. As noted above, solvent extraction uranium recovery generally involves the use of an organic carrier which is immiscible with water such as an immiscible hydrocarbon or substituted hydrocarbon, or an immiscible ether, alcohol, or ketone. Kerosene, which is a mixture of hydrocarbons, is a preferred immiscible organic carrier used in solvent extraction uranium recovery. The process of the present invention provides a method of removing any residual immiscible organic carrier from phosphoric acid after solvent extraction uranium recovery. It is particularly advantageous to use the process of the present invention to remove residual amounts of hydrocarbons or substituted hydrocarbons from phosphoric acid after solvent extraction uranium recovery using these immiscible organic carriers. In a preferred embodiment of the present invention, the process of the present invention is used to remove residual hydrocarbon carrier from phosphoric acid after solvent extraction uranium recovery using a hydrocarbon carrier. The removal of residual amounts of kerosene, which is a mixture of hydrocarbons, from substantially uranium-free phosphoric acid after solvent extraction uranium recovery will illustrate this preferred embodiment of the present invention.

Gypsum, which is a hydrous calcium sulfate, has been found to be a particularly effective sorbent for the removal of residual amounts of hydrocarbons such as kerosene. Other sorbents may, of course, be used in the process of the present invention to remove residual amounts of kerosene and other immiscible organic carriers. For example, reference may be made to the table of Physical Properties of Adsorbent Materials in the *Chemical Engineer's Handbook, Fifth Edition*, edited by Robert H. Perry and Cecil H. Chilton, pages 16-5 and 16-6 (McGraw Hill 1973), which is hereby incorporated by reference. The siliceous sorbents set forth are particularly contemplated for use in the practice of the present invention. Suitable siliceous sorbents include alumino-silicates, calcium silicate, magnesium silicate, acid-treated clay, magnesia-silica gel, Fuller's earth, and diatomaceous earth. Other inorganic sorbents such as calcium sulfate may also be used in the practice of the present invention.

The process of the present invention requires contacting the substantially uranium-free phosphoric acid containing residual organic carrier with the sorbent material so that the sorbent material can sorb or take up the residual organic carrier. In a preferred embodiment of the present invention the sorbent material is formed into a filter cake and the substantially uranium-free phosphoric acid containing residual organic carrier after solvent extraction uranium recovery is passed through the filter cake to transfer the residual organic carrier to the sorbent material. Thereafter, the organic carrier-laden filter cake is separated from the phosphoric acid, thereby producing purified phosphoric acid from which the residual organic solvent has been removed. Any of the usual techniques for contacting a liquid with a solid sorbent may be used. Reference may be made to the *Chemical Engineer's Handbook, Fifth Edition*, chapters 15, 16 and 19, supra, which describes sorption and extraction systems, and which are hereby incorporated by reference. For example, the sorbent may be mixed thoroughly with the phosphoric acid containing residual organic carrier, and subsequently separated using a thickener or by flotation methods. Alternative techniques for contacting the substantially uranium-free phosphoric acid containing residual organic carrier with the sorbent material include: percolation of the phosphoric acid through a packed column containing the sorbent material; agitation of the phosphoric acid and sorbent material in a tank, followed by centrifugation; or agitation of the phosphoric acid and the sorbent material in a tank, followed by hydrocycloning.

It has been found that at a given kerosene level in the substantially uranium-free phosphoric acid, the degree of kerosene removal using the process of the present invention is a function of the quantity of sorbent material used compared to the quantity of kerosene to be removed by contact with the sorbent material. The residual organic carrier level in the substantially uranium-free phosphoric acid after treatment using the process of the present invention is found to be less than about 20 ppm by weight provided that about 10 to about 15 pounds of sorbent material are used per pound of residual organic carrier, that intimate contact between the sorbent material and the phosphoric acid is achieved during treatment, and that the sorbent material is completely separated from the phosphoric acid after treatment.

It has been found that the filtration rate of the phosphoric acid may vary during the process of the present invention. Thus, for example, filtration rates from about 0.2 to about 1.5 gallons per minute per square foot have been used to reduce the residual organic carrier level to less than about 20 ppm by weight. Either higher or lower filtration rates can also be used in the process of the present invention. The temperature of the phosphoric acid to be treated according to the process of the present invention may also vary. Thus, for example, the temperature of the phosphoric acid may vary between about 72° to 120° F. A preferred temperature range for the process of the present invention is between about 80° to about 90° F., although either higher or lower temperatures can also be used.

As mentioned above, the controlling factor determining the removal of residual organic carrier is the sorbent to residual organic carrier ratio. Phosphoric acid containing between about 20 to about 1700 ppm by weight residual organic carrier can be treated according to the process of the present invention to reduce the residual organic carrier level to not more than about 20 ppm by weight. Preferably, however, phosphoric acid to be treated according to the process of the present invention will not contain more than about 500 ppm by weight of residual organic carrier. If the sorbent material is gypsum and is formed into a filter cake and the phosphoric acid is passed through the filter cake to transfer the residual organic carrier to the sorbent material, it is found that a gypsum filter cake of one-quarter inch thickness is effective in the process of the present invention to reduce the residual organic carrier level to not more than about 20 ppm by weight. Alternatively, the sorbent material may, for example, be a 10:1 weight:weight ratio of gypsum material with either diatomaceous earth or perlite. It has been found that a filter cake of such a mixed sorbent material of at least one-half inch thickness is effective to reduce the residual organic carrier level after treatment according to the present invention to not more than about 20 ppm by weight. As those in the art will recognize, the maximum sorbent material to be used will be determined by the achievable flow rates and the time required to filter the phosphoric acid solution through a thicker filter cake. The quantity of sorbent material to be used can thus be easily determined.

EXAMPLES

The invention will be illustrated with examples of the removal of residual kerosene from substantially uranium-free phosphoric acid after solvent extracting using a kerosene carrier by filtering the phosphoric acid through a gypsum containing filter cake. It is particularly preferred to form the gypsum containing filter cake from gypsum obtained during the manufacture of wet-process phosphoric acid.

EXAMPLE 1

Filter cakes were prepared from wet gypsum from a Prayon Bird filter, which is a vacuum pan filter and filtration apparatus used in the Prayon method for the production of phosphoric acid, and slurried with 30% by weight phosphoric acid. The slurry was placed on a Saran filter cloth in a 7 cm diameter Buchner funnel. For each volume of kerosene-containing-phosphoric acid tested, a new filter cake was made using different quantities of gypsum. Samples were taken from each volume after filtration and analyzed after extraction with carbon disulfide in a Varian model 3700 gas chromatograph with the following results:

| SAMPLE | ACID VOLUME FILTERED | KEROSENE IN FILTRATE PARTS PER MILLION BY WEIGHT | GYPSUM USED GRAMS |
|---|---|---|---|
| 1 | Initial Acid | 568 | — |
| 2 | 100 ml | 12 | 10 |
| 3 | 100 ml | 18 | 13.4 |
| 4 | 100 ml | 5 | 50 |
| 5 | 100 ml | 5 | 50 |

EXAMPLE 2

Using the preferred embodiment of the invention illustrated in the drawing, a gypsum filter cake one-quarter inch thick was formed on a filter table using gypsum which was a by-product from the production of wet-process phosphoric acid. The water passing through the gypsum filter was pumped to a water recycle system. As the filter table turned, the gypsum filter cake dried, phosphoric acid containing from about 200 to about 400 ppm by weight residual kerosene after solvent extraction uranium recovery was filtered through the gypsum filter cake at a rate less than or equal to 1.2 gallons of phosphoric acid per pound of gypsum. The phosphoric acid filtrate was found to contain less than 10 ppm by weight of kerosene. The phosphoric acid filtrate was transferred to an evaporator feed tank for further processing. The contaminated gypsum filter cake was washed with water to remove residual phosphoric acid and sluiced to a gypsum field.

EXAMPLE 3

Samples of phosphoric acid containing kerosene were treated according to the process of the present invention by filtering the phosphoric acid through a filter cake at least one-half inch thick of 10:1 weight:weight ratio of gypsum to diatomaceous earth or perlite. The temperature of the phosphoric acid varied between about 80° to about 90° F. The filtration rate of the phosphoric acid through the sorbent material was about 0.2 gallons per minute per square foot. Samples were taken before and after filtration and analyzed with the following results:

| SAMPLE | KEROSENE BEFORE FILTRATION PARTS PER MILLION BY WEIGHT | KEROSENE AFTER FILTRATION PARTS PER MILLION BY WEIGHT |
|---|---|---|
| 1 | 337 | 22 |
| 2 | 373 | 20 |
| 3 | 382 | 11 |
| 4 | 199 | 32 |
| 5 | 222 | 15 |
| 6 | 246 | 5 |
| 7 | 796 | 5 |
| 8 | 41 | 20 |
| 9 | 277 | 38 |
| 10 | 200 | 6 |
| 11 | 166 | 8 |
| 12 | 174 | 11 |
| 13 | 616 | 7 |
| 14 | 123 | 14 |
| 15 | 111 | 13 |
| 16 | 460 | 4 |
| 17 | 126 | 11 |
| 18 | 385 | 11 |
| 19 | 317 | 3 |
| 20 | 215 | 25 |
| 21 | 133 | 14 |
| 22 | 191 | 6 |
| 23 | 158 | 6 |
| 24 | 151 | 5 |
| 25 | 29 | 4 |
| 26 | 150 | 25 |

It is understood that various other modifications will be apparent to and can readily be made by those skilled in the art without departing from the broad scope and spirit of this invention. Accordingly, it is not intended that the scope of the claims appended hereto be limited to the description set forth herein, but rather that the claims be construed as encompassing all the alternatives, modifications and variations which would be treated as equivalents thereof by those skilled in the art in light of the foregoing description.

What is claimed is:

1. A method of purifying phosphoric acid after a solvent extraction process, comprising:
   contacting phosphoric acid containing residual organic carrier after a solvent extraction process with a gypsum sorbent which sorbs said residual organic carrier,
   sorbing said residual organic carrier on said gypsum sorbent to form organic carrier-laden sorbent and,
   separating said organic carrier-laden sorbent from said phosphoric acid, thereby purifying said phosphoric acid after solvent extraction.

2. The method of claim 1 wherein said phosphoric acid is wet-process phosphoric acid.

3. The method of claim 1 wherein said residual organic carrier contains kerosene.

4. The method of claim 1 wherein said sorbent is formed into a filter cake and said phosphoric acid containing residual organic carrier is filtered through said filter cake, thereby contacting said phosphoric acid with said sorbent, sorbing said organic carrier onto said sorbent, and subsequently separating said phosphoric acid from said sorbent.

5. The method of claim 2 wherein said residual organic carrier contains kerosene.

6. The method of claim 1 wherein said gypsum is formed into a filter cake and said phosphoric acid containing residual organic carrier is filtered through said gypsum containing filter cake.

7. The method of claim 1 wherein said solvent extraction process is a solvent extraction uranium recovery process.

8. The method of claim 1, wherein said residual organic carrier is a liquid which is immiscible with water selected from the group consisting of unsubstituted hydrocarbons, substituted hydrocarbons, ethers, alcohols and ketones.

9. The method of claim 1, wherein the temperature of the phosphoric acid is between about 72° and about 120° F.

10. A method of purifying wet-process phosphoric acid after a solvent extraction process in which said solvent is dissolved in kerosene, comprising:
    forming a filter cake of gypsum, filtering wet-process phosphoric acid containing residual kerosene after solvent extraction through said filter cake to form a kerosene-laden filter cake, and separating said kerosene-laden filter cake from said wet-process phosphoric acid, thereby purifying said wet-process phosphoric acid after solvent extraction.

11. The method of claim 10 wherein said solvent extraction process is a solvent extraction uranium recovery process.

12. A method of purifying phosphoric acid after a solvent extraction process, comprising:

contacting phosphoric acid containing residual organic carrier after a solvent extraction process with a sorbent which sorbs said residual organic carrier, wherein said sorbent is selected from the group consisting of alumino-silicates, calcium silicate, magnesium silicate, acid-treated clay, magnesia-silica gel, Fuller's earth, diatomaceous earth and calcium sulfate, sorbing said residual organic carrier on said sorbent to form organic carrier-laden sorbent and, separating said organic carrier-laden sorbent from said phosphoric acid, thereby purifying said phosphoric acid after solvent extraction.

13. The method of claim 12 wherein calcium sulfate has been removed from said phosphoric acid prior to said solvent extraction process.

* * * * *